(12) United States Patent
Walker, IV et al.

(10) Patent No.: US 7,201,386 B2
(45) Date of Patent: Apr. 10, 2007

(54) WHEELED SLED

(75) Inventors: Matt Walker, IV, St. Louis, MO (US); Melvin Anderson Gross, Lee's Summit, MO (US)

(73) Assignee: Mental Engineering, Inc., St. Louis, MO (US)

( * ) Notice: Subject to any disclaimer, the term of this patent is extended or adjusted under 35 U.S.C. 154(b) by 339 days.

(21) Appl. No.: 10/126,017

(22) Filed: Apr. 19, 2002

(65) Prior Publication Data

US 2003/0197341 A1    Oct. 23, 2003

(51) Int. Cl.
    *B62M 1/00*    (2006.01)
(52) U.S. Cl. .................................... 280/87.021
(58) Field of Classification Search ........... 280/87.042, 280/87.041, 87.021, 842
    See application file for complete search history.

(56) References Cited

U.S. PATENT DOCUMENTS

| | | | |
|---|---|---|---|
| 3,565,452 A * | 2/1971 | Trumley et al. | ............... 280/15 |
| 3,638,903 A * | 2/1972 | Pietrzak et al. | ............... 249/71 |
| 3,952,354 A | 4/1976 | Turner | |
| 3,973,785 A | 8/1976 | Becker et al. | |
| 4,033,622 A * | 7/1977 | Boudreau | .............. 297/256.13 |
| 4,036,506 A | 7/1977 | Scheib | |
| 4,046,392 A | 9/1977 | Dredger et al. | |
| 4,098,519 A | 7/1978 | Reid, Jr. | |
| 4,134,599 A | 1/1979 | DiMille et al. | |
| 4,141,566 A | 2/1979 | Benes et al. | |
| 4,145,064 A | 3/1979 | Carn | |
| 4,175,760 A | 11/1979 | Gustafson | |
| 4,190,261 A | 2/1980 | Moutz | |
| 4,193,608 A | 3/1980 | Gunderson | |
| 4,231,612 A * | 11/1980 | Meeker | ................. 297/256.13 |
| 4,244,593 A | 1/1981 | Malone | |
| 4,262,919 A | 4/1981 | Krent | |
| 4,285,529 A | 8/1981 | Vaillancourt | |
| 4,291,891 A | 9/1981 | Blanchette | |
| 4,537,412 A | 8/1985 | Hill | |
| 4,573,695 A | 3/1986 | Kennel | |
| 4,650,198 A | 3/1987 | Sherretts | |
| 4,657,266 A | 4/1987 | Bohme | |
| 4,678,445 A | 7/1987 | Monreal | |
| 4,796,902 A | 1/1989 | Capra | |
| 4,861,052 A | 8/1989 | Hediger | |
| 5,092,615 A | 3/1992 | Gregalis | |
| 5,258,422 A * | 11/1993 | Chang et al. | ................ 523/124 |
| 5,335,925 A | 8/1994 | Dolson | |
| 5,486,013 A | 1/1996 | Kilk et al. | |
| 5,573,257 A | 11/1996 | Olivieri | |
| 5,620,191 A | 4/1997 | Sayette | |
| 5,645,289 A | 7/1997 | Harmon | |

(Continued)

FOREIGN PATENT DOCUMENTS

WO    WO 91/08101    *   6/1991

OTHER PUBLICATIONS

US Patent Office Publication 2002/136945 - dated Sep. 2000 Call, Ronald W. et al.*

*Primary Examiner*—Bryan Fischmann
(74) *Attorney, Agent, or Firm*—Armstrong Teasdale LLP

(57) ABSTRACT

A sled is provided which includes a composition configured for use in the sled. The composition includes a polypropylene copolymer having an IZOD impact resistance from about 0.1 ft lb/in to about 30.0 ft lb/in.

14 Claims, 2 Drawing Sheets

U.S. PATENT DOCUMENTS

| | | | |
|---|---|---|---|
| 5,685,604 A * | 11/1997 | Kain | 297/256.15 |
| D393,233 S | 4/1998 | Emanuel | |
| 5,810,376 A | 9/1998 | Matheny | |
| 5,855,384 A * | 1/1999 | Pike et al. | 280/47.38 |
| 5,893,570 A | 4/1999 | Kehrmann | |
| 5,927,732 A | 7/1999 | Snyder | |
| 6,068,269 A | 5/2000 | Bergeron | |
| D426,492 S * | 6/2000 | Pappalardo | D12/6 |
| 6,087,459 A * | 7/2000 | Miro et al. | 526/128 |
| 6,116,622 A | 9/2000 | Gibbons | |
| 6,209,894 B1 | 4/2001 | Walker, IV | |
| 6,255,425 B1 * | 7/2001 | Asanuma et al. | 526/348 |
| 6,257,599 B1 | 7/2001 | Johnson et al. | |
| 6,276,700 B1 | 8/2001 | Way et al. | |
| 6,279,925 B1 | 8/2001 | Miller | |
| 6,310,551 B1 | 10/2001 | Croft | |
| 6,349,950 B1 | 2/2002 | Levy et al. | |
| 6,375,204 B1 * | 4/2002 | Tu | 280/87.042 |
| 6,706,829 B2 * | 3/2004 | Boussie et al. | 526/161 |
| 2002/0136945 A1 * | 9/2002 | Call et al. | |
| 2005/0035564 A1 * | 2/2005 | Mehrmann | 280/18 |

* cited by examiner

WHEELED SLED

BACKGROUND OF THE INVENTION

This invention relates generally to sleds, and in particular to a sled including wheels that can be used on a solid surface in the absence of snow.

For years, sleds have been a favorite recreational toy with children and adults because of the fun which sled riding provides. Such sleds are typically equipped with runners which contact snow or ice covering the ground and provide the mechanism for moving the sled and rider forward. These types of sleds are typically made of metal or wood.

It is also known to have wheels or wheels and runners on a sled as an alternative to having only runners. Such sleds are sometimes termed summer sleds since those sleds may be used in the summer time in the absence of snow or ice on the ground. Such wheeled sleds provide fun and entertainment for children and adults alike. In addition, sleds sometimes have arms or attachments for riders to use to shift their body weight and induce steering of the sled, particularly on sleds which do not have steering or guidance systems.

BRIEF DESCRIPTION OF THE INVENTION

In one aspect, a sled is provided which comprises a composition configured for use in the sled. The composition includes a polypropylene copolymer having an IZOD impact resistance from about 0.1 ft lb/in to about 30.0 ft lb/in.

In another aspect, a sled is provided which comprises a sled chassis comprising a front, a rear, a pair of longitudinally extending sides, an upper surface and a bottom. The upper surface including a substantially planar surface portion configured for supporting a sled user. The chassis comprises a polypropylene copolymer having an IZOD impact resistance from about 0.1 ft lb/in to about 30.0 ft lb/in.

In another aspect, a process is provided for manufacturing a sled. The process includes preparing an extrudable polypropylene copolymer composition and injection molding the same. The injection molded copolymer has an IZOD impact from about 0.1 ft lb/in to about 30.0 ft lb/in.

DETAILED DESCRIPTION OF THE INVENTION

An exemplary embodiment of a wheeled sled and a method of manufacturing such a sled are described below in detail. Since the sled is intended to be used on grassy surfaces, such as hillsides, the sled has an impact resistance that is sufficient to enable it to withstand impacts with stationary objects, such as rocks and other obstacles at normal operating speeds.

Figure 1:
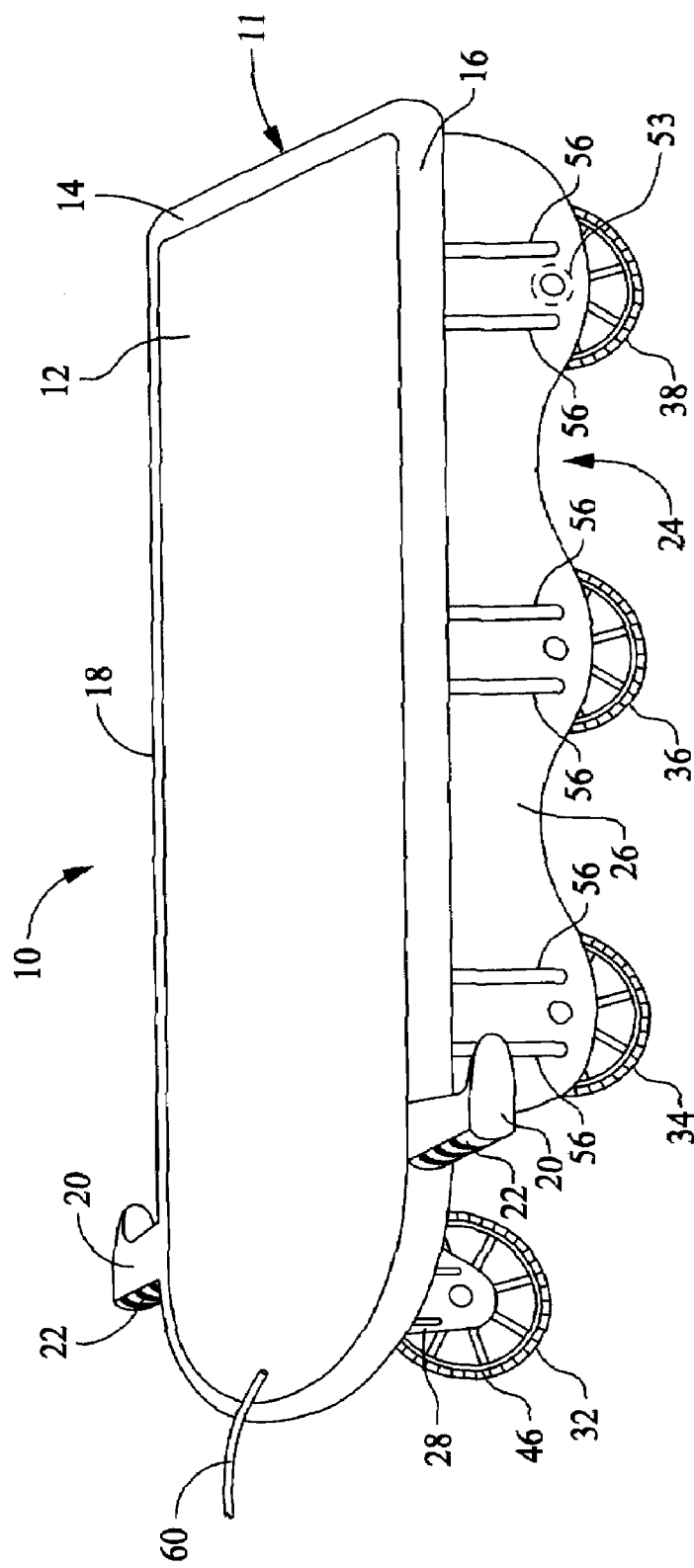
FIG. 1 is a perspective view of a sled in accordance with one embodiment of the invention.
Figure 2:
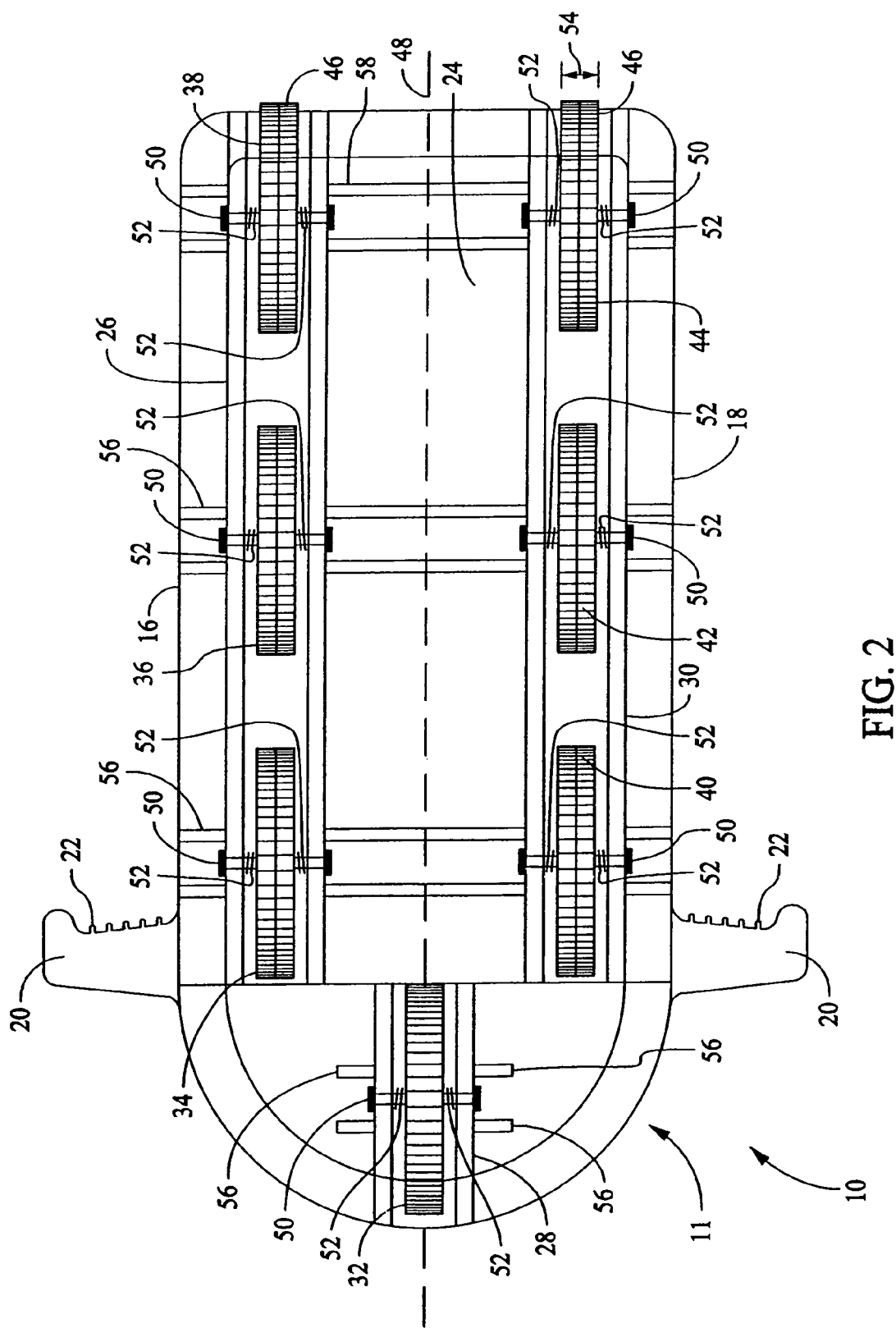
FIG. 2 is a bottom view of the sled shown in FIG. 1.

FIG. 1 is a perspective view and FIG. 2 is a bottom view of a sled 10 including a sled chassis 11 having a substantially flat top surface, or platform, 12 and a rim 14 surrounding platform 12. Sled chassis 11 also includes a first side 16 and a second side 18. A handle 20 extends from each side 16 and 18. Handles 20 are formed to include a contoured grip portion 22. Sled chassis 11 also includes a bottom 24, a first wheel attachment section 26, a second wheel attachment section 28, and a third wheel attachment section 30. Each wheel attachment section extends from bottom 24.

Sled 10 further includes a plurality of wheels 32, 34, 36, 38, 40, 42, and 44 that are the same size and include a notched tread design 46. In one embodiment, notched tread design 46 creates a noise to indicate use of sled 10 on a hard surface, such as a street or a sidewalk. Since sled 10 is intended to be used on grassy surfaces, noise from the tread is intended to dissuade use of sled 10 on surfaces other than grass, particularly pavement.

As best illustrated in FIG. 2, wheels 34, 36, 38, 40, 42, and 44 are arranged in two rows of three wheels each. Each row is symmetrical about a central axis 48 extending along bottom 24. Wheel 32, which is the foremost wheel is positioned along central axis 48 and is raised with respect to wheels 34, 36, 38, 40, 42, and 44 such that when wheels 34, 36, 38, 40, 42, and 44 contact a flat surface, wheel 32 does not touch the flat surface. The height that wheel 32 is raised reduces the likelihood of nose-diving on non-linear surfaces such as created by hills, valleys, holes and obstacles, e.g., rocks. Although sled 10 is illustrated with two rows of three wheels, it should be understood that any number of wheels may be utilized in any number of rows.

Each wheel 32, 34, 36, 38, 40, 42, and 44 is attached to a respective wheel attachment portion with an axle 50 extending through a center of a respective wheel and through a respective wheel attachment portion. In one embodiment, each axle 50 is a bolt retained on a respective wheel attachment portion. In an alternative embodiment, adjacent wheels, such as wheels 34 and 40 are attached to a single axle. Axles 50 for wheels 34, 36, 38, 40, 42, and 44 are positioned at the same height while axle 50 for wheel 32 is raised with respect to the other axles 50.

A spring 52 is positioned around axle 50 on each side of each wheel 32, 34, 36, 38, 40, 42, and 44 between a side edge of the wheel and the respective wheel attachment portion such that there are two springs for each wheel. Springs 52 maintain the proper alignment of each wheel.

Each wheel includes a bearing 53 contained within the wheel. The bearings contact axle 50 and provide for a smooth rolling of the wheel. The sides of each wheel 32, 34, 36, 38, 40, 42, and 44 have a substantially conical shape such that the center portion of the wheel surrounding axle 50 has a smaller width than a width 54 of the tread of the wheel.

Each wheel attachment portion 26, 28, and 30 includes a plurality of support ribs 56 connected to bottom 24. In addition, wheel attachment portions 26 and 30 include a plurality of support ribs 58 extending therebetween and connected to bottom 24.

Sled 10 also includes a rope 60, or other pulling device, attached to a front of sled 10. Rope 60 extends through an opening through platform 12 and is secured in place with a fastening mechanism such as a knot at a first end of rope 60. In one embodiment, a second end of rope 60 is attached to a back of sled 10 such that both ends of rope 60 are attached to sled 10. Sled 10 includes a notch into which the second end of rope 60 extends.

Sled 10 is manufactured from any plastic material having desirable characteristics. In one embodiment, an exemplary composition useful for sled 10 is a copolymer comprising a polypropylene copolymer having at least one ethylene modifier which provides high resistance against impact breakage at low temperature and has an IZOD impact resistance from about 0.1 ft lb/in to about 30.0 ft lb/in at 73° F. In one exemplary embodiment, sled 10 is resistant to a 2 ft lb/in impact at negative 20° F.

As used herein, the term "polypropylene" includes any of various thermoplastic plastics that are polymers of propylene. As used herein, the term "thermoplastic" includes compositions made by polymerizing propylene. ASTM means ASTM International, 100 Barr Harbour Drive, P.O. Box C700, West Conshohocken, Pa., USA 19428-2959.

Useful polypropylenes includes polyolefins such as impact polypropylene copolymer which is a crystalline polymer exhibiting high stiffness and excellent impact strength at sled riding temperatures such as temperatures in the range from about 0° F. to about 100° F. Typically such a polypropylene copolymer is a polypropylene ethylene modified material.

Reinforcing agents or additives may be included in a suitable polypropylene composition including glass fibers, talc, glass, and the like which form suitable and effective composites with polypropylene. Any effective polypropylene reinforcing agent may be employed to form a composite useful in this invention. A colorant or combination of colorants may be employed. In an exemplary embodiment, red is utilized as the color of the composition although any desired color can be utilized. In addition, the composition may lack color.

It has been determined that the impact resistance of a plastic sled is increased over that of other plastic sleds when the material of composition has an IZOD impact as described above.

As defined by ASTM, IZOD impact is usually a notched or single point impact test conducted under industry recognized standards of testing (ASTM D256) which provides a numerical measurement of the resistance of a material to impact at a point from a swinging pendulum. The IZOD impact is by ASTM definition the amount of kinetic energy needed to start and complete fracture of a material upon impact with a metal pendulum swinging from a defined distance. ASTM Method D256 is designed to produce fracture of the material. During the test the pedulum strikes a notched point on the impacted material. IZOD impact is measured in Joules/Meter where meters is the width of the material.

Useful polypropylene copolymers are made by the polymerization of polypropylene including ethylene modifiers in a copolymerization process which is known by those of skill in the art. The desired IZOD impact is attained by combining appropriate amounts of polypropylene with desired ethylene modifiers.

Illustrative useful polypropylene copolymers are available from Huntsman Polymers Corporation, 3040 Post Oak Boulevard, P.O. Box 27707, Houston, Tex. 77227-7707. A particularly useful Huntsman copolymer is identified as product P6E5A-004 from Huntsman Polymers Corporation. This impact copolymer has a melt flow rate of about 15 g/10 min. as determined by D1238. (ASTM), a density of about 0.9 g/cm 3 D1505, a tensile yield strength of about 9 Mpa D638, a flexural modulus of about 1% secant of 660 Mpa and tangent of about 670 Mpa D790, an ultimate elongation of about 8% D638, a deflection temperature at 66 psi of about 67° C., D648 and a Gardner impact at −30° C. greater than 36 J D3029. This composition provides a highly durable impact resistant material of construction for a sled, such as sled 10 described above.

In addition to wheeled sleds, the above described composition and methods of manufacture are useful on traditional sleds equipped with runners and runners and wheels.

The above described sled is prepared from polypropylene with an ethlylene modified copolymer which can be suitably injection molded, i.e. it has a suitable melt flow range for injection molding. Initially a polypropylene copolymer composition is prepared which is injection molded into the form or mold desired for a sled, or sled chassis. The process of preparing the injection molded sled chassis begins with a design for the sled and/or sled chassis. A mold is made based on the design and is tested so that the molded part from the mold will form the sled as designed.

Pellets of the desired polypropylene copolymer are fed into a suitable injection molding machine. Injection molding machines typically include an injection unit and a clamping unit. Pellets are melted in the injection unit by heat applied by the machine and by the action of screws therein. A mold, such as described above, receives the melt from the injection unit. The temperature of the injection unit is such that a suitable shot for the mold is provided without burning the melt. The melt takes the shape of the mold. Illustratively, to form a sled the mold is configured to provide a molded product which has the shape, size and desired thickness of a sled such as the sled described above. A clamping unit holds the mold together. The clamping unit releases and ejects the mold after the mold is cooled.

The injection molding machine can be a screw type whereby a screw is caused to rotate and produce the melting or by pumping of the melt of the screw. As is well known in the art, the power to rotate the screw is supplied by a gear from a motor.

Typically the melted polymer flows from the nozzle to the mold through a connection. When the injection molding cycle is complete, the mold is cooled and the molded product is released from the mold.

After manufacture, the sled is taken to a slope and used in a manner similar to the manner in which a snow sled is used during the winter when there is snow or ice covering the ground. The sled is ridden in a prone or laying down position and braking of the sled is done by the rider dragging his/her feet and making contact with the ground. Typically steering of the sled is accomplished by shifting or moving the riders body weight with respect to the two front wheels and turning the rider's body in the direction in which the rider desires to have the rider and summer sled move.

While the invention has been described in terms of various specific embodiments, those skilled in the art will recognize that the invention can be practiced with modification within the spirit and scope of the claims.

What is claimed is:

1. A sled comprising:
   a chassis comprising a top surface, a bottom surface, a front end portion, and a rear end portion;
   a plurality of roller wheels attached to said chassis and arranged in two rows, each row symmetrical about a central longitudinal axis of said chassis; and
   a center wheel attached to said chassis and located on said central longitudinal axis and located closer to said front end portion than said plurality of said roller wheels, said center wheel raised with respect to said plurality of said roller wheels so that when said plurality of roller wheels contact a flat surface, said center wheel does not touch the flat surface;
   said chassis further comprising an injection moldable polypropylene copolymer having an IZOD impact resistance from about 0.1 ft lb/in to about 30.0 ft lb/in.

2. A sled in accordance with claim 1 wherein the copolymer is an ethylene modified copolymer.

3. A sled in accordance with claim 1 wherein the polypropylene is substantially translucent.

4. A sled in accordance with claim 1 further comprising a plurality of axles, each said wheel associated with a respective said axle.

5. A sled in accordance with claim 4 further comprising a plurality of springs, each axle including a first spring positioned on a first side of a respective said wheel and a second spring positioned on a second side of said respective said wheel.

6. A sled in accordance with claim 1 wherein each said wheel comprises a bearing contained therein.

7. A sled in accordance with claim 1 wherein said chassis is an integrally molded one piece unit.

8. A sled comprising a sled chassis comprising:
   a front, a rear, a pair of longitudinally extending sides, an upper surface and a bottom, said upper surface including a substantially planar surface portion configured for supporting a sled user;
   a plurality of roller wheels attached to said chassis and arranged in two rows, each row symmetrical about a central longitudinal axis of said chassis; and
   a center wheel attached to said chassis and located on said central longitudinal axis and located closer to said front than said plurality of said roller wheels, said center wheel raised with respect to said plurality of said roller wheels so that when said plurality of roller wheels contact a flat surface, said center wheel does not touch the flat surface;
   said chassis further comprising an injection moldable polypropylene copolymer having an IZOD impact resistance from about 0.1 ft lb/in to about 30.0 ft lb/in.

9. A sled in accordance with claim 8 wherein the copolymer is an ethylene modified copolymer.

10. A sled in accordance with claim 8 wherein said copolymer is substantially translucent.

11. A sled in accordance with claim 8 further comprising a plurality of axles, each said wheel associated with a respective said axle.

12. A sled in accordance with claim 8 wherein each said wheel comprises a bearing contained therein.

13. A sled in accordance with claim 11 further comprising a plurality of springs, each said axle including a first spring positioned on a first side of a respective said wheel and a second spring positioned on a second side of said respective said wheel.

14. A sled in accordance with claim 8 wherein said chassis is an integrally molded one piece unit.

\* \* \* \* \*